(12) United States Patent
Ronda

(10) Patent No.: US 6,723,963 B2
(45) Date of Patent: Apr. 20, 2004

(54) QUICK-COOKING POT

(75) Inventor: Giovanni Ronda, Thiene (IT)

(73) Assignee: Ronda S.p.A., Zane' (IT)

( * ) Notice: Subject to any disclaimer, the term of this patent is extended or adjusted under 35 U.S.C. 154(b) by 8 days.

(21) Appl. No.: 10/148,332

(22) PCT Filed: Oct. 1, 2001

(86) PCT No.: PCT/EP01/11338
§ 371 (c)(1),
(2), (4) Date: May 28, 2002

(87) PCT Pub. No.: WO02/28240
PCT Pub. Date: Apr. 11, 2002

(65) Prior Publication Data
US 2003/0080106 A1 May 1, 2003

(30) Foreign Application Priority Data
Oct. 6, 2000 (IT) ..................................... PD2000A0233

(51) Int. Cl.⁷ .................. A47J 27/08; A47J 27/086; A47J 27/05
(52) U.S. Cl. .................. 219/431; 219/401; 219/440; 99/403
(58) Field of Search ................. 219/401, 429, 219/430, 431, 437, 440; 99/403

(56) References Cited

U.S. PATENT DOCUMENTS 3,823,307 A * 7/1974 Weiss .......................... 219/439
4,238,996 A   12/1980 Okuyama
5,092,229 A * 3/1992 Chen ............................ 99/403

FOREIGN PATENT DOCUMENTS

| CH | A-652 293 | 11/1985 |
| DE | A-24 57 075 | 6/1976 |
| FR | A-2 635 960 | 3/1990 |

* cited by examiner

Primary Examiner—Joseph Pelham
(74) Attorney, Agent, or Firm—Guido Modiano; Albert Josif; Daniel O'Byrne

(57) ABSTRACT

A quick-cooking pot, comprising two complementary containers to be stacked in a hermetic reversible coupling, the first container being provided with means for heating the water contained therein and with at least one first controlled-opening valve for the passage of a preset and presettable dose of hot water and/or water vapor into the second container.

11 Claims, 2 Drawing Sheets

QUICK-COOKING POT

TECHNICAL FIELD

The present invention relates to a quick-cooking pot.

BACKGROUND ART

Methods for conventional cooking with steam or boiling water, using pots of the conventional type, are well-known.

Known cooking methods, by immersing the food in boiling water or placing the food in a position in which it is affected by the steam generated by the boiling water, are particularly slow.

Furthermore, it is known that these kinds of cooking methods are dependent on external pressure and are therefore disadvantageous at altitude.

All these disadvantages are further detrimental to the consumption of energy and raw materials.

In fact, in order to cook a certain amount of food with boiling water or steam, an excessive amount of water is often used together with a large amount of heat energy to raise it to the appropriate temperature.

DISCLOSURE OF THE INVENTION

The aim of the present invention is to solve or substantially reduce the problems of known types of implement, such as pots, for cooking food in boiling water or steam.

Within the scope of this aim, an important object is to provide a pot by virtue of which it is possible to cook at higher temperatures and more rapidly than with conventional methods.

Another object is to provide a pot that allows to cook with steam that is pressurized and at a high temperature.

A further object is to provide a pot that allows to cook in a manner that is absolutely independent of external pressure.

A still further object is to provide a pot that allows to cook in boiling water or steam with a great saving of energy and raw materials.

Another object is to provide a pot that is ergonomic.

This aim and these and other objects that will become better apparent hereinafter are achieved by a quick-cooking pot, characterized in that it comprises two complementary containers to be stacked in a hermetic reversible coupling, the first container being provided with means for heating water contained therein and with at least one first controlled-opening valve for the passage of a preset and presettable dose of hot water and/or water vapor into the second container.

BRIEF DESCRIPTION OF THE DRAWINGS

Further characteristics and advantages of the invention will become better apparent from the description of a preferred but not exclusive embodiment thereof, illustrated only by way of non-limitative example in the accompanying drawings, wherein.

WAYS OF CARRYING OUT THE INVENTION

Figure 1:
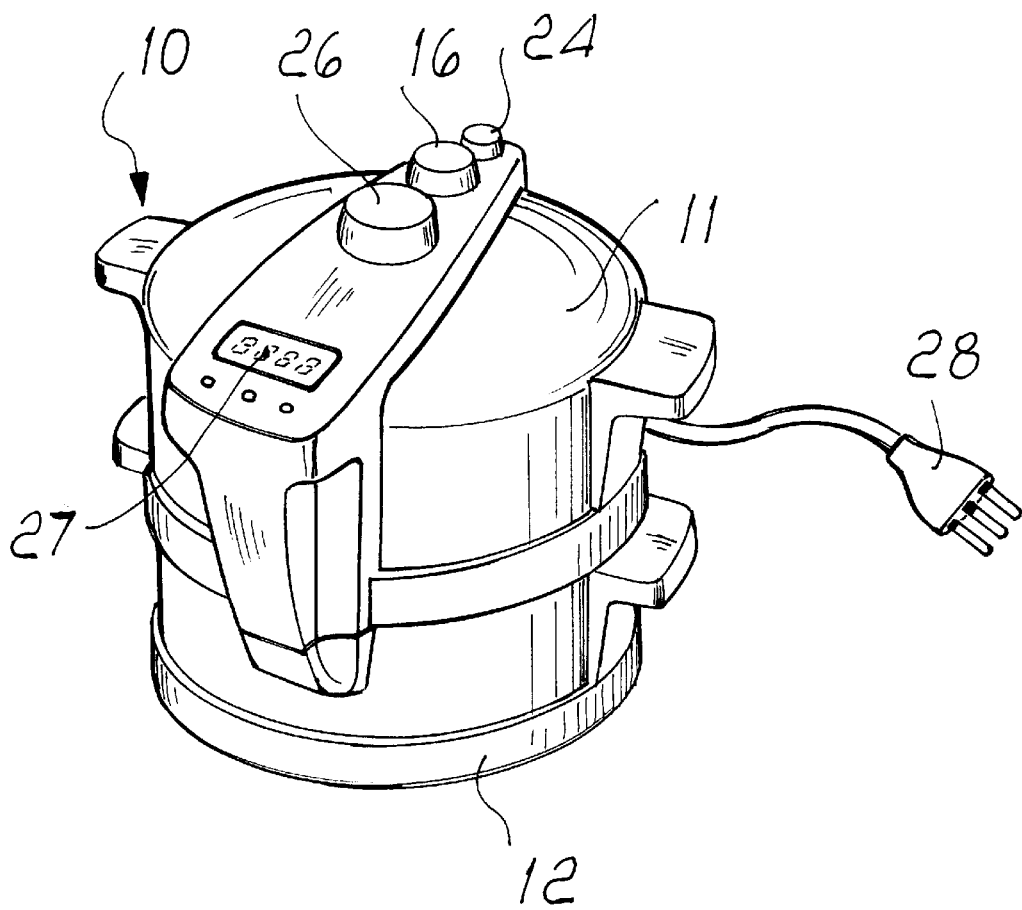
FIG. 1 is a perspective view of a pot according to the invention.
Figure 2:
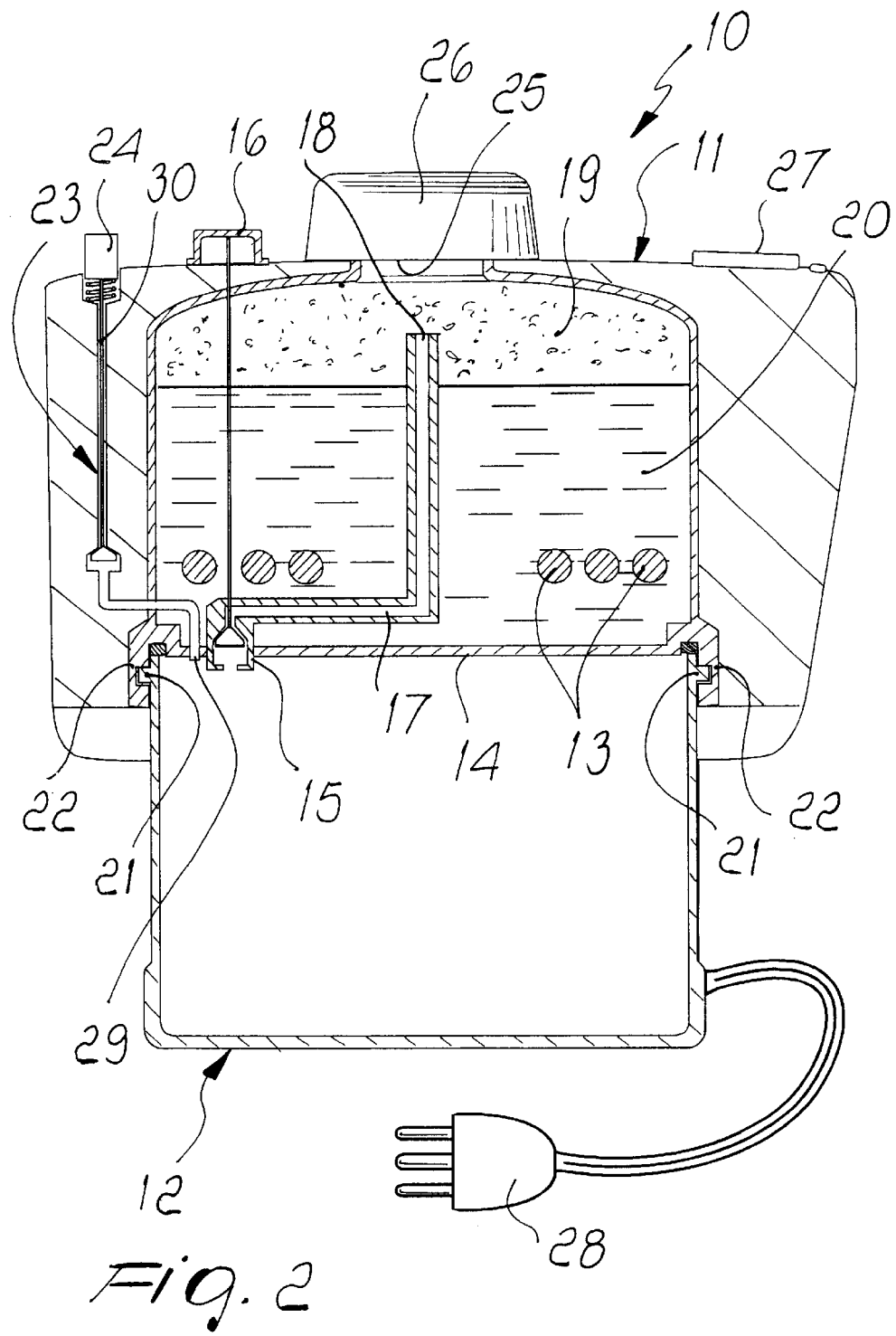
FIG. 2 is a sectional side view of the pot of FIG. 1.

With reference to the figures, a quick-cooking pot according to the invention is generally designated by the reference numeral 10.

The pot 10 is constituted by two complementary containers 11 and 12 to be stacked.

The first container 11, to be arranged on top, is provided with water heating means 13, which in this case are advantageously constituted by an electric immersion heater, designated by the same reference numeral 13, to be supplied by means of an electric plug 28.

On the bottom 14 of the first container 11 there is a first valve 15, which is opened by a knob 16 arranged above the first container 11.

In practice, the valve 15 is a three-way valve whose opening is controlled by the knob 16, allowing the passage of a preset and presettable amount of hot water 20 or water vapor 19 contained inside the first container 11.

In particular, the water vapor 19 passes through a duct 17, whose inlet 18 is arranged at the upper portion of the first container 11, where the water vapor 19 is located.

The second container 12 is cylindrical, does not have a lid, and has an upper rim 21 that is shaped so as to provide a hermetic reversible coupling, in this case a bayonet-type coupling, by means of a gasket that is not shown, with a lower edge 22 of the first container 11, whose bottom 14 defines, on assembly, the lid of the second container 12.

On the bottom 14 of the first container 11 there is also an inlet 29 of a second valve, generally designated by the reference numeral 23, for venting the second container 12 through a corresponding duct 30 that runs laterally to the container 12 in a vertical direction.

The second valve 23 is actuated by a button 24 located above the first container 11.

The first container 11 further has, in its upper part, an opening 25 provided with a hermetic lid 26 that is used to fill the first container 11 with water.

Finally, the first container 11 is provided with a thermometer/temperature regulator, not shown in the figure but in any case of the per se known type, which is used to monitor the temperature of the water contained in the container 11 and to set the temperature it is meant to reach.

The set temperature values, as well as the temperature reached inside the container 11, are displayed in the upper portion of said container 11 by way of a display 27, which also comprises a timer, not shown.

As regards operation, while the first container 11 is filled with water through the opening 25, a preset amount of the food to be cooked is introduced in the second container 12.

The first container 11 and the second container 12 are then assembled hermetically and it is possible to activate the electric immersion heater 13, by using the electric plug 28, to heat the water 20 and obtain water vapor 19.

When the water 20 has reached the intended temperature, one can decide to proceed with steaming or with cooking in boiling water simply by acting on the actuation knob 16 of the valve 15, further introducing the dose of hot water or steam required by the food contained in the second container 12.

The cooking time depends on the type and amount of food introduced in the second container 12.

When the food is cooked, by acting on the button 24 the second valve 23 is activated, equalizing the pressure inside the second container 12 and the external pressure and finally allowing to uncouple the two containers 11 and 12 and to have free access to the food.

By way of the display 27 it is thus possible to set the final temperature of the water contained in the first container 11 and to calculate and program the cooking times for the different types of food.

It is very important to note that the first container 11 can remain hermetically closed at all times until the entire amount of water and steam contained therein has been used up.

Furthermore, conveniently the water and steam remain always at the set temperature, allowing the user to cook equally with steam or boiling water, with a great saving of time and energy.

In particular, if the water contained in the first container 11 is raised to a temperature of 120°, it is possible to cook a serving of pasta in just four minutes.

It is thus evident that thanks to the pot according to the invention having an innovative structure it is possible to cook directly with higher temperatures than with conventional methods, to cook with steam under pressure and at high temperature, and to cook irrespective of the external pressure, improving as a whole the organoleptic characteristics of the products.

The present invention is susceptible of numerous modifications and variations, all of which are within the scope of the inventive concept.

The technical details can be replaced with other technically equivalent elements.

The materials and the dimensions may be any according to the requirements.

The disclosures in Italian Patent Application No. PD2000A000233 from which this application claims priority are incorporated herein by reference.

What is claimed is:

1. A quick-cooking pot, comprising two complementary containers to be stacked in a hermetic reversible coupling, the first container being provided with means for heating water contained therein and with at least one first controlled-opening valve for the passage of a preset and presettable dose of hot water and/or water vapor into the second container, wherein said at least one first valve is arranged on the bottom of said first container and is connected to means for a controlled opening of said valve, which are located above said first container.

2. The pot according to claim 1, wherein said first and second containers are cylindrical, said second container being open at the top and being provided with an upper rim that is shaped so as to provide a reversible hermetic coupling with a lower edge of said first container, the bottom of said first container providing, on assembly, the lid of said second container.

3. The pot according to claim 1, wherein said first valve is a three-way valve for the controlled passage of hot water or steam from the first container to the second container, said steam passing through a duct with an inlet located in an upper portion of the first container, which contains water vapor.

4. The pot according to claim 1, wherein said heating means are electrically powered.

5. The pot according to claim 4, wherein said electrically-powered heating means comprise an electric immersion heater.

6. The pot according to claim 1, wherein said first container is provided, in an upward region, with a water loading opening provided with a hermetic lid.

7. The pot according to claim 1, comprising a second valve for venting the second container.

8. The pot according to claim 7, further comprising a second valve for venting the second container, an inlet of said second valve being located on the bottom of said first container and the venting duct running laterally to said first container in a vertical direction, said second valve further comprising an actuation button arranged above said first container.

9. The pot according to claim 1, comprising a thermometer/temperature regulator for the water contained in said first container.

10. The pot according to claim 9, comprising a timer.

11. The pot according to claim 10, wherein said thermometer/temperature regulator and said timer are visible on a display, which is located at the top of said first container.

* * * * *